US010518284B2

(12) United States Patent
Thurow et al.

(10) Patent No.: US 10,518,284 B2
(45) Date of Patent: Dec. 31, 2019

(54) INTERACTIVE LIQUID SPRAYING SYSTEM AND METHOD

(71) Applicant: Intelligent Agricultural Solutions, LLC, Fargo, ND (US)

(72) Inventors: Bradley R. Thurow, Fargo, ND (US); Paul A. Nystuen, West Fargo, ND (US); Barry D. Batcheller, West Fargo, ND (US)

(73) Assignee: Intelligent Agricultural Solutions LLC, Fargo, ND (US)

( * ) Notice: Subject to any disclaimer, the term of this patent is extended or adjusted under 35 U.S.C. 154(b) by 288 days.

(21) Appl. No.: 15/228,991

(22) Filed: Aug. 4, 2016

(65) Prior Publication Data

US 2017/0036228 A1 Feb. 9, 2017

Related U.S. Application Data

(60) Provisional application No. 62/201,010, filed on Aug. 4, 2015.

(51) Int. Cl.
*B05B 12/00* (2018.01)
*B05B 1/30* (2006.01)
*B05B 1/12* (2006.01)
*A01M 7/00* (2006.01)
*A01C 23/00* (2006.01)
(Continued)

(52) U.S. Cl.
CPC .......... *B05B 12/008* (2013.01); *A01C 23/007* (2013.01); *A01M 7/0042* (2013.01); *A01M 7/0089* (2013.01); *B05B 1/12* (2013.01); *B05B 1/3046* (2013.01); *B05B 12/085* (2013.01); *G05D 7/0635* (2013.01); *G01F 1/667* (2013.01)

(58) Field of Classification Search
CPC ....... B05B 12/008; B05B 1/02; B05B 1/3046; B05B 9/0403; B05B 1/12; B05B 12/085; A01M 7/0042; A01M 7/0089; A01C 23/047; A01C 23/007; F16K 1/443; G01F 1/667; G05D 7/0635
USPC ................................ 137/613, 614.11, 614.18
See application file for complete search history.

(56) References Cited

U.S. PATENT DOCUMENTS

| 202,629 | A | * | 4/1878 | Byrne | ..................... F16K 1/443 |
| | | | | | 137/630.18 |
| 1,707,630 | A | * | 4/1929 | Erceg | ........................ F16K 1/38 |
| | | | | | 137/614.11 |

(Continued)

FOREIGN PATENT DOCUMENTS

| DE | 19536220 | 4/1997 |
| EP | 966327 | 12/1999 |

(Continued)

*Primary Examiner* — Darren W Gorman
*Assistant Examiner* — Steven M Cernoch

(57) ABSTRACT

An intelligent spray nozzle, comprising an input pressure sensor, a flow rate sensor, a flow modulator, a nozzle pressure sensor, a linear actuator, and an output orifice modulator, wherein an input pressure read from the input pressure sensor and a flow rate read from the flow rate sensor are used as inputs by the flow modulator to drive the at least one linear actuator to control an output spray rate from the intelligent spray nozzle, and wherein a nozzle pressure read from the nozzle pressure sensor is used as feedback for the output orifice modulator, wherein an output orifice is modified by the output orifice modulator to achieve optimal output spray.

5 Claims, 3 Drawing Sheets

(51) Int. Cl.
  *B05B 12/08*  (2006.01)
  *G05D 7/06*  (2006.01)
  *G01F 1/66*  (2006.01)

(56) References Cited

U.S. PATENT DOCUMENTS

| | | | |
|---|---|---|---|
| 2,998,198 A | | 8/1961 | Young |
| 3,853,272 A * | | 12/1974 | Decker ............... A01M 7/0089 239/155 |
| 4,354,523 A * | | 10/1982 | Hochmuth ........... F16L 29/007 137/322 |
| 4,637,547 A * | | 1/1987 | Hiniker .................. B05B 12/00 239/1 |
| 5,080,133 A * | | 1/1992 | Johnson ................. B60T 13/18 137/625.12 |
| 5,134,961 A * | | 8/1992 | Giles ................... A01M 7/0089 118/300 |
| 5,193,746 A | | 3/1993 | Iwamura et al. |
| 5,323,963 A | | 6/1994 | Ballu |
| 5,333,644 A * | | 8/1994 | Heyden .................. F16K 1/443 137/614.18 |
| 5,348,226 A * | | 9/1994 | Heiniger ............. A01M 7/0057 239/1 |
| 5,442,552 A * | | 8/1995 | Slaughter ............ G05D 1/0246 701/28 |
| 5,653,389 A | | 8/1997 | Henderson et al. |
| 5,833,144 A * | | 11/1998 | Kinter ................. A01M 7/0089 239/462 |
| 5,908,161 A | | 6/1999 | Womac et al. |
| 5,941,462 A | | 8/1999 | Sandor |
| 5,967,066 A | | 10/1999 | Giles et al. |
| 6,036,116 A | | 3/2000 | Bui |
| 6,047,718 A * | | 4/2000 | Konsky .................. F16K 1/443 137/1 |
| 6,126,088 A * | | 10/2000 | Wilger ................ A01M 7/0089 239/159 |
| 6,193,166 B1 | | 2/2001 | Miller et al. |
| 6,209,582 B1 * | | 4/2001 | Ashley ................... B60T 8/327 137/625.5 |
| 6,460,783 B1 | | 10/2002 | Christopher |
| 6,705,549 B2 | | 3/2004 | Nakamura |
| 6,834,223 B2 * | | 12/2004 | Strelioff .............. A01M 7/0057 239/167 |
| 7,096,802 B1 * | | 8/2006 | Kiest .................... A01C 23/024 111/119 |
| 7,124,964 B2 | | 10/2006 | Bui |
| 7,213,613 B2 * | | 5/2007 | Spakowski ............ F16K 1/443 123/568.2 |
| 7,624,755 B2 * | | 12/2009 | Benda .................... F16K 1/443 137/516.27 |
| 7,861,946 B2 | | 1/2011 | Beeren |
| 7,938,337 B2 | | 5/2011 | Tian |
| 8,191,795 B2 | | 6/2012 | Grimm et al. |
| 8,205,807 B2 * | | 6/2012 | Ballu .................... B05B 7/1263 239/291 |
| 8,430,346 B2 * | | 4/2013 | Michael ................ B05B 5/0533 137/554 |
| 8,646,478 B2 * | | 2/2014 | Nunez ...................... F16K 1/02 137/315.27 |
| 8,678,034 B2 * | | 3/2014 | Bennauer ............. F01D 17/145 137/630 |
| 8,839,681 B2 * | | 9/2014 | Stewart ................... G01F 1/52 73/314 |
| 8,919,676 B2 | | 12/2014 | Funseth et al. |
| 9,073,070 B2 | | 7/2015 | Funseth et al. |
| 9,744,540 B2 * | | 8/2017 | Teele ....................... B05B 1/32 |
| 9,795,977 B2 * | | 10/2017 | Grimm .................. B05B 12/085 |
| 2006/0273189 A1 * | | 12/2006 | Grimm .................. B05B 9/0423 239/146 |
| 2012/0222759 A1 * | | 9/2012 | Knis .................... F02M 37/0023 137/512.2 |
| 2014/0053928 A1 * | | 2/2014 | Berger .................... F16K 1/443 137/614.11 |
| 2015/0306618 A1 | | 10/2015 | Petter et al. |
| 2015/0375247 A1 | | 12/2015 | Funseth et al. |

FOREIGN PATENT DOCUMENTS

| | | | |
|---|---|---|---|
| EP | 0979938 A2 * | 2/2000 | ............. F16K 1/443 |
| EP | 2975307 A1 * | 1/2016 | ......... F24D 19/1018 |

\* cited by examiner

INTERACTIVE LIQUID SPRAYING SYSTEM AND METHOD

CROSS-REFERENCE TO RELATED APPLICATION

This application claims priority in U.S. Provisional Patent Application No. 62/201,010 filed Aug. 4, 2015, which is incorporated herein by reference.

BACKGROUND OF THE INVENTION

1. Field of the Invention

This invention relates generally to the spray application of chemicals, and more specifically to a liquid spraying system configured for automatically adjusting spray patterns utilizing interactive spray nozzle adjustments.

2. Description of the Related Art

Spraying systems have utilized a wide variety of adjustable nozzle configurations and spray operation controls, which are generally based on the liquids being sprayed, environmental factors and other operational considerations. Without limitation, an exemplary application of the present invention is in a mobile agricultural spraying system, which applies liquids to field crops. For example, such liquids can comprise herbicides, pesticides, liquid fertilizers, nutrients and other substances facilitating crop yields.

The spraying system operating condition variables include pump pressure, discharge nozzle configurations and fluid flow rates. These and other aspects of spraying systems can be controlled to deliver more or less of the liquid to the target surfaces. However, changing the operating pressures and the flow rates in spraying systems can have adverse effects on other operational variables, such as droplet sizes. If the droplet size created is too small, the spray becomes susceptible to drift in even a light breeze, such that chemicals may drift over the intended target and settle on an unintended target, such as non-crop land, a water supply, animals, or people. Such drift issues can thus have negative effects on spraying operations.

Other environmental conditions can also affect agricultural spraying system performance. For example, temperature and humidity can affect spray material droplets and change plant absorption of the sprayed chemicals.

An effective spraying system, especially for agricultural applications, preferably provides selective and/or individual control of each spray nozzle. This can help avoid overlapping chemical applications, enable sectional control (allowing varying amounts of chemical to be applied at different locations, e.g., based on criteria such as sensor readings and pre-determined field conditions), and compensate for blocked nozzles and other system issues.

The present invention addresses such spraying system issues. Heretofore there has not been available an interactive liquid spraying system and method with the advantages and features of the present invention.

SUMMARY OF THE INVENTION

According to one aspect of the present invention, an interactive spraying system includes an intelligent spray nozzle with an input pressure sensor, a flow rate sensor, a flow modulator, a nozzle pressure sensor, a linear actuator, and an output orifice modulator, wherein an input pressure read from the input pressure sensor and a flow rate read from the flow rate sensor are used as inputs by the flow modulator to drive the at least one linear actuator to control an output spray rate from the intelligent spray nozzle, and wherein a nozzle pressure read from the nozzle pressure sensor is used as feedback for the output orifice modulator, and wherein an output orifice is modified by the output orifice modulator to achieve optimal output spray.

These and other aspects are achieved by the present invention, which is described in detail in the following specification and the accompanying drawings which form a part hereof.

BRIEF DESCRIPTION OF DRAWINGS

The drawings constitute a part of this specification and include exemplary embodiments of the present invention illustrating various objects and features thereof.

DETAILED DESCRIPTION OF THE PREFERRED EMBODIMENT

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Interactive Liquid Spraying System 2

With reference to the drawings, an interactive liquid spraying system 2 is described.

Figure 2:
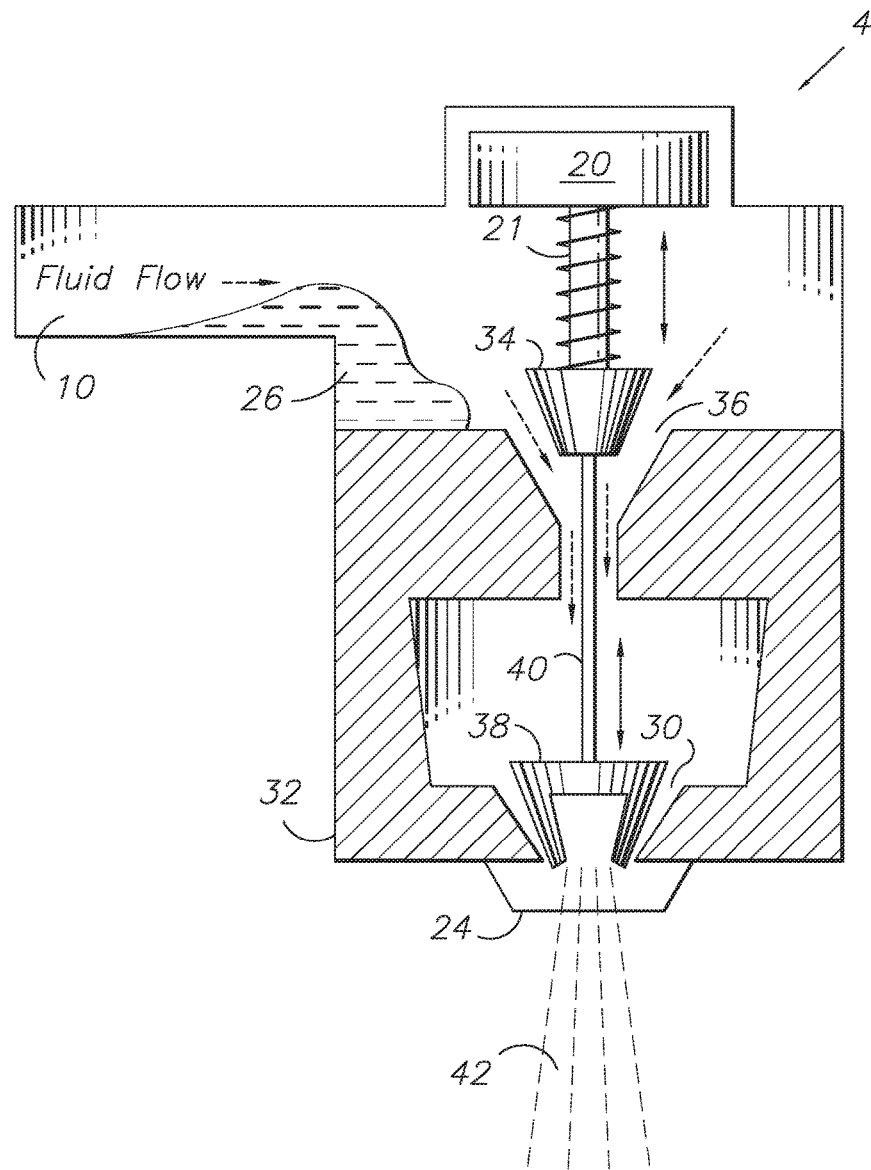
FIG. 2 is a block diagram illustrating a potential design for the spraying system for enabling flow control and spray pattern shaping for an intelligent spray nozzle.
Figure 3:
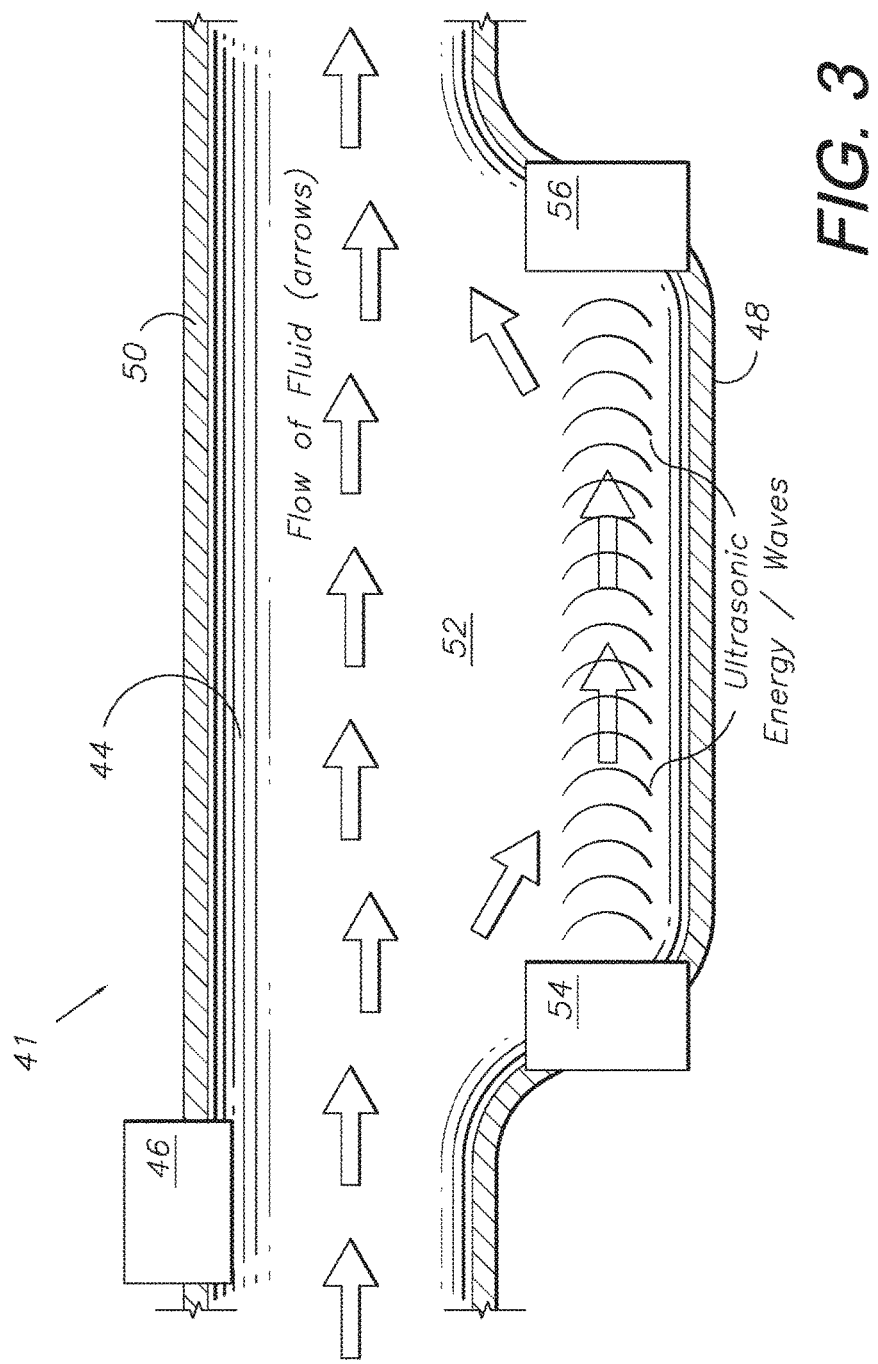
FIG. 3 is an illustration of how a flow sensor and pressure sensor may be integrated into the spraying system to provide control feedback and monitoring.

In general, the overall aspects of the invention, which is an interactive liquid spraying system 2, are as follows:

Spray nozzles 4 (FIG. 2) function as "intelligent" nozzles in the spraying system 2, and automatically adjust the droplet sizes as the flow rate is changed in order to ensure controlled and consistent droplet sizes across all flow rates.
- The intelligent spray nozzles 4 allow individual control, wherein each such intelligent spray nozzle 4 in the system 2 can be controlled independently of all other nozzles 4.

The intelligent spray nozzles 4 include adjustable orifice openings to aid in droplet size control and spray pattern shaping.

The spraying system 2 includes a microprocessor 6 programmed for operating the system 2 in response to various inputs.

The spraying system 2 is configured for automatically adjusting the nozzle/flow pressure for a given input pressure via a pressure controller 8.

The intelligent spray nozzles 4 are electrically actuated and controlled, allowing both flow rate control and nozzle opening control.

The system 2 includes a fluid input 10, which can include a pump, an input pressure sensor 12, a precision flow sensor 14 for control feedback and monitoring and a flow modulator 16.

Each intelligent spray nozzle 4 includes a precision nozzle pressure sensor 18 for control feedback and monitoring.

Each intelligent spray nozzle 4 includes a linear actuator 20 connected to an output orifice modulator 22 for controlling a spray pattern 42 from a spray output or nozzle outlet 24.

The system 2 includes blockage monitoring using the flow sensors 14 associated with the nozzles 4.

Figure 1:
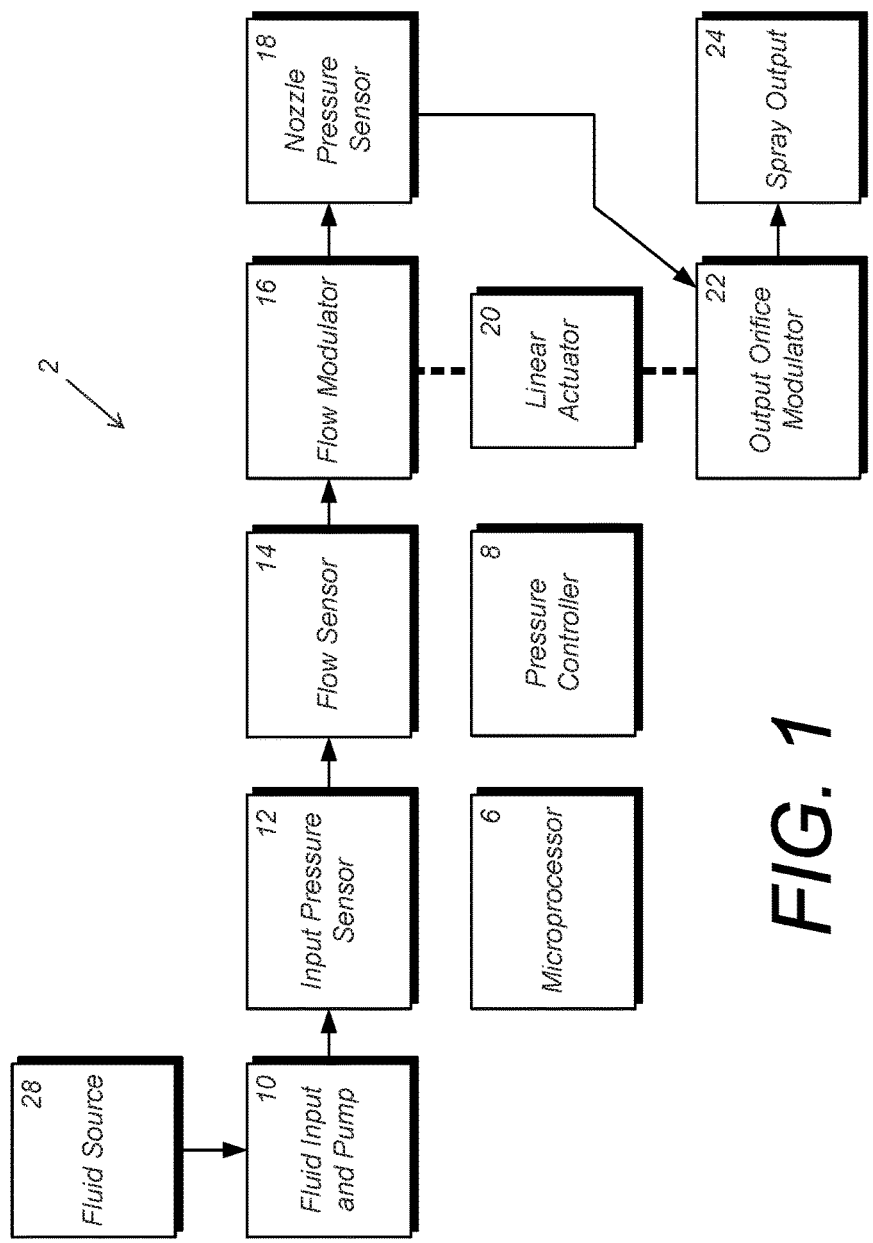
FIG. 1 is a block diagram showing one embodiment of an interactive liquid spraying system embodying an aspect of the present invention.

FIG. 1 is a block diagram showing one embodiment of the invention in a spraying system 2. In this embodiment, fluid 26 is received in the fluid input and pump 10 from a fluid source 28, e.g., a tank mounted on a mobile piece of equipment and containing a quantity of liquid 26 for spraying with the system 2. The fluid input can be a simple opening into a conduit or cavity, such as the interior of the nozzle housing, through which the fluid 26 can flow. The fluid 26 flows past the input pressure sensor 12 so that the input pressure can be obtained, and past a flow sensor 14 so that the rate of flow of the fluid can be obtained.

This information (the input pressure and flow rate) is passed into the flow modulator module 16, which uses the sensor information as well as the user-defined or pre-defined "desired" application rate and, optionally, environmental information (wind, weather, etc.) to determine the proper way to drive the linear actuator 20 which will control the size and shape of the output orifice opening 30 (through the output orifice modulator 22). The liquid 26 will also flow past a nozzle pressure sensor 18 and the information obtained (the pressure of the fluid inside the nozzle body 32) will also be used by the output orifice modulator 22 to determine the best shape for the output orifice opening.

The size and shape of the output orifice opening 30 will be modulated to help determine the pressure of the spray output and its shape and pattern, and it will also have an effect on droplet size.

FIG. 2 shows the internal construction of the spray nozzle 4 with components enabling flow control and spray pattern shaping for an intelligent spray nozzle 4. This design represents one possible embodiment and is not meant to be limiting. FIG. 2 shows a cutaway or sectional view of the intelligent spray nozzle 4, showing the internal construction.

Fluid 26 enters the nozzle through the fluid input or inlet 10, which includes a suitable pump for pumping the fluid 26 from the fluid source 28 through the system 2. The fluid 26 then flows through a flow control opening 36 toward the orifice opening 30. The amount of fluid 26 passing through the flow control opening 36 (the flow rate of the fluid) can be controlled by a flow control feature 34, which can be raised and lowered by the actuator 20 such that it moves either out of or farther into the flow control opening 36 via a connecting rod and return spring subassembly 21, reducing the amount of fluid 26 that can flow through the flow control opening 36 at a given time. The actuator 20 is driven by commands from the flow modulator 16 (see FIG. 1).

Once the fluid 26 flows through the flow control opening 36, it flows into the orifice opening 30 where it will exit the nozzle 4 through the nozzle outlet 24. An orifice shape feature 38 is controlled by the actuator 20 via a plunger shaft 40 connection such that the orifice shape feature 38 moves into and out of the orifice opening 30, whereby the orifice shape feature 38 opens or closes the orifice opening 30 by changing its size and shape of the orifice, thus functioning as a flow control valve controlling the spray pattern and flow rate.

Ideally, both the flow control feature 34 and the orifice shape feature 38 can be moved using a single actuator 20, connected via a common plunger shaft 40. In alternate embodiments, however, the orifice shape feature 38 can move independently of the flow control feature 34, and two or more actuators 20 can be used in these embodiments.

The control of fluid 26 flow through the flow control opening 36 and the shape and size of the orifice opening 30 will ultimately create the shape and behavior of the spray pattern 42 emerging from the spray output or nozzle outlet 24.

FIG. 3 is a cross-sectional view of a flow and pressure sensor subsystem 41 housed in a section of a flow conduit or pathway section 44. The sensor subsystem 41 is adapted for use in the interactive liquid spraying system 2 of the present invention and provides feedback and monitoring of performance parameters of the system 2. The flow conduit or pathway 44 can be fully integrated into the body or housing 32 of an intelligent spray nozzle 4. The flow of fluid 26 is shown in FIG. 3 by arrows.

A pressure transducer 46 is introduced in the wall of the flow conduit 44 or embedded inside the conduit, and it senses the pressure of the fluid 26 in the conduit 44. An enlarged section 48 of the flow conduit 44 bulges out such that conduit walls 50 that are more or less perpendicular to the flow of fluid are created, and a chamber 52 for measuring fluid flow is created. At one end of the enlarged section 48 of conduit, an ultrasonic transducer 54 is placed, and an ultrasonic receiver 56 is placed at an opposite end of the enlarged section 48. The ultrasonic transducer 54 emits waves of ultrasonic energy which are detected by an ultrasonic receiver 56.

Measuring the flow rate of a fluid using ultrasonic energy is well known. The "time of flight" of the ultrasonic energy to move from transducer to receiver is measured in still water and then again in flowing water, and the change in time of flight between the two helps determine the flow rate.

In addition to using the ultrasonic energy to measure the flow rate, it may be used to determine whether the proper amount of chemical is added to a mixture. For example, the time of flight for ultrasonic energy to move a known distance in pure, still water is known. If a known chemical (with its own known time of flight values) is introduced into the water, and then the time of flight in the still mixture is measured, and the difference measured between the new rate and that of pure water can be used to measure the amount of chemical that was introduced into the pure water. Once this mixture is determined, additional chemicals can be introduced one at a time in the same manner, using the changing time of flight to determine the amounts of any new chemicals introduced.

Additional features and alternate embodiments are possible without deviating from the intent of the inventive concept described here. Some of these ideas are captured in the Appendix to this specification, which contains selected slides with notes on design options.

The examples shown in the figures and described above are intended to be exemplary only and are not meant to be limiting in any way.

Having this described the invention, what is claimed as new and desired to be secured by Letters Patent is:

1. An interactive liquid spraying system, which comprises:
   a fluid source adapted for containing a quantity of spraying liquid;
   a pump with an inlet connected to the fluid source;
   a flow conduit connected to the pump;
   an input pressure sensor connected to said flow conduit;
   a flow sensor connected to said flow conduit;
   a nozzle body connected to the flow conduit, the nozzle body forming and including a nozzle outlet, wherein internal to the nozzle body and upstream from the nozzle outlet, the nozzle body has a flow control opening in the nozzle body with a flow control feature shaped to interact with the flow control opening, the flow control feature being adjustably received in the flow control opening to influence a flow of liquid through the flow control opening, said nozzle body further including an orifice opening located downstream from said flow control opening and immediately adjacent the nozzle outlet, with an orifice shape feature shaped to interact with the orifice opening, the orifice shape feature being adjustably received in the orifice opening to influence a flow of liquid through the orifice opening and enabling flow control and spray pattern shaping;
   an actuator having a plunger shaft, the plunger shaft being connected to said flow control feature and to said orifice shape feature, wherein the actuator is configured to simultaneously extend said flow control feature into said flow control opening and to extend said orifice shape feature into said orifice opening, or to simultaneously retract said flow control feature out of said flow control opening and to retract said orifice shape feature out of said orifice opening; and
   a microprocessor connected to said input pressure sensor, said flow sensor and said actuator, said microprocessor configured to actuate said actuator in response to a predetermined fluid pressure sensed by said input pressure sensor and a predetermined flow conditions sensed by flow sensor, wherein the microprocessor controls the actuator for extending and retracting said flow control feature relative to said flow control opening and for extending and retracting said orifice shape feature relative to said orifice opening to adjust a spray pattern from said nozzle outlet.

2. The spraying system according to claim 1, which includes a flow modulator connected to said flow conduit and configured for modulating a fluid flow through said nozzle body.

3. The spraying system according to claim 2, which includes an output orifice modulator in said nozzle body, said output orifice modulator configured for adjusting said orifice opening with said orifice shape feature and said at least one actuator.

4. The spraying system according to claim 2, which includes:
   a fluid inlet connected to said flow conduit and said nozzle body; and
   said fluid inlet mounting said at least one actuator and said flow control feature.

5. The spraying system according to claim 1, which includes:
   said flow conduit including an enlarged section located between said pump and said nozzle body;
   an ultrasonic transducer mounted on said conduit enlarged section; an ultrasonic receiver mounted on said conduit and large section and oriented to receive ultrasonic transmissions from said ultrasonic transducer;
   said ultrasonic receiver configured for generating signals representing fluid flow in said conduit enlarged section; and
   said microprocessor being connected to said ultrasonic receiver and programmed for controlling said spraying system in response to said fluid flow representative signals.

* * * * *